United States Patent
Abedini et al.

(10) Patent No.: US 11,197,171 B2
(45) Date of Patent: Dec. 7, 2021

(54) BEAM CONFIGURATION OF A SMART MMW REPEATER FOR FORWARDING RACH MESSAGE 2

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/750,469

(22) Filed: Jan. 23, 2020

(65) Prior Publication Data
US 2021/0235283 A1 Jul. 29, 2021

(51) Int. Cl.
*H04W 16/28* (2009.01)
*H04W 56/00* (2009.01)
*H04W 74/08* (2009.01)
*H04W 74/00* (2009.01)

(52) U.S. Cl.
CPC ......... *H04W 16/28* (2013.01); *H04W 56/001* (2013.01); *H04W 74/008* (2013.01); *H04W 74/0833* (2013.01)

(58) Field of Classification Search
CPC . H04W 16/28; H04W 56/001; H04W 74/008; H04W 74/0833
USPC .................................................. 370/329–330
See application file for complete search history.

(56) References Cited

U.S. PATENT DOCUMENTS

| | | | |
|---|---|---|---|
| 2018/0343653 A1* | 11/2018 | Guo | H04L 5/0053 |
| 2019/0132850 A1 | 5/2019 | Sun et al. | |
| 2019/0150190 A1* | 5/2019 | Kim | H04W 56/00 370/329 |
| 2019/0158337 A1* | 5/2019 | Yoon | H04L 27/2666 |
| 2019/0356524 A1* | 11/2019 | Yi | H04L 5/0094 |
| 2019/0380099 A1* | 12/2019 | Hakola | H04B 7/088 |
| 2020/0059967 A1* | 2/2020 | Kim | H04W 72/042 |
| 2020/0128455 A1* | 4/2020 | Da Silva | H04W 74/004 |

(Continued)

OTHER PUBLICATIONS

International Search Report and Written Opinion—PCT/US2021/014391—ISA/EPO—dated May 10, 2021.

(Continued)

*Primary Examiner* — Candal Elpenord
(74) *Attorney, Agent, or Firm* — QUALCOMM Incorporated

(57) ABSTRACT

Various aspects include methods for beam sweep configuration of a millimeter wave (MMW) repeater in a fifth generation (5G) network during random access channel (RACH) procedures. Various embodiments include receiving an RACH 1 message relayed by an MMW repeater, determining a beam sweep schedule for use by the MMW repeater in relaying a random access response (RAR) message in response to the RACH 1 message, wherein the beam sweep schedule indicates a series of RAR messages to be sent successively and a different transmit (TX) beam sweep configuration to be used by the MMW repeater for each of the series of RAR messages, generating an RAR control message indicating the beam sweep schedule, sending, by the processor of the network device, the RAR control message to the MMW repeater, and sending the series of RAR messages to the MMW repeater.

30 Claims, 11 Drawing Sheets

(56) References Cited

U.S. PATENT DOCUMENTS

2020/0162956 A1* 5/2020 Cui .................. H04L 5/0048
2020/0305088 A1* 9/2020 Nory ................ H04W 52/242

OTHER PUBLICATIONS

"Motivation for a Work Item for New Radio RF Repeater", 3GPP TSG RAN Meeting #85, 3GPP Draft; RP-191881_New_Wid_For_Discussion_on_5G_Repeaters_Motivation, 3rd Generation Partnership Project (3GPP), Mobile Competence Centre; 650, Route Des Lucioles; F-06921 Sophia-Antipolis Cedex. Vol. TSG RAN, No. Newport Beach, California, US; 20190916-20190920, 9 pages, Sep. 12, 2019 (Sep. 12, 2019), XP051782427, Retrieved from the Internet: URL: http://www.3gpp.org/ftp/tsg_ran/TSG_RAN/TSGR_85/Docs/.

* cited by examiner

BEAM CONFIGURATION OF A SMART MMW REPEATER FOR FORWARDING RACH MESSAGE 2

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago. One of the methods used for increasing data rates involve transmitting radio frequency (RF) signals toward receiver devices using beam forming antennas rather than via omnidirectional antenna, thereby increasing the number of wireless devices that may be supported by a given base station while increasing transmission power directed at a particular wireless device.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for beam sweep configuration of a millimeter wave (MMW) repeater in a fifth generation (5G) network during random access channel (RACH) procedures. In various aspects, the methods may be performed by a processor of a network device, such as a Next Generation NodeB (gNB), etc., and/or performed by a processor of an MMW repeater.

Various aspects may include receiving an RACH 1 message relayed by an MMW repeater, determining a beam sweep schedule for use by the MMW repeater in relaying a random access response (RAR) message in response to the RACH 1 message, the beam sweep schedule indicating a series of RAR messages to be sent successively and a different transmit (TX) beam sweep configuration to be used by the MMW repeater for each of the series of RAR messages, generating an RAR control message indicating the beam sweep schedule, sending the RAR control message to the MMW repeater, and sending the series of RAR messages to the MMW repeater.

Various aspects may further include receiving a message 3 relayed by the MMW repeater, wherein the message 3 is generated in response to at least one of the series of RAR messages, determining a suitable beam for communicating with a computing device based at least in part on the message 3, and sending a cancelation message to the MMW repeater in response to determining that the suitable beam for communicating with the computing device, in which the cancelation message is configured to cause the MMW repeater to cancel any remaining RAR messages in the beam sweep schedule. In some aspects, the message 3 may be relayed by the MMW repeater according to one or more conditions indicated in the RAR control message.

Various aspects may further include determining a suitable beam for communicating with a computing device based at least in part on the message 3 and sending an indication of the suitable beam to the MMW repeater.

In some aspects, the different TX beam sweep configuration associated with a first of the series of RAR messages to be sent according to the beam sweep schedule may generate a same beam as used by the MMW repeater to receive the RACH 1 message or forward a synchronization signal block (SSB).

Various aspects may further include receiving an RACH 1 message relayed by an MMW repeater, determining a beam sweep schedule for use by the MMW repeater in relaying an RAR message in response to the RACH 1 message, wherein the beam sweep schedule indicates a series of RAR messages to be sent successively and a different TX beam sweep configuration to be used by the MMW repeater for each of the series of RAR messages, selecting an initial RAR message of the series of RAR messages to send, generating an initial RAR control message indicating the different TX beam sweep configuration associated with the selected initial RAR message, sending the initial RAR control message to the MMW repeater, and sending the selected initial RAR message to the MMW repeater.

Various aspects may further include determining whether a message 3 relayed by the MMW repeater in response to the initial RAR control message is successfully received, and determining a suitable beam for communicating with a UE computing device based at least in part on the message 3 in response to determining that the message 3 relayed by the MMW repeater in response to the initial RAR control message was successfully received.

Various aspects may further include sending an indication of the suitable beam to an MMW repeater and sending a message 4 to be relayed by the repeater to the computing device using the suitable beam.

Various aspects may further include, in response to determining that a message 3 relayed by the MMW repeater in response to the initial RAR control message was not successfully received, selecting a next RAR message of the series of RAR messages to send, generating a next RAR control message indicating the different TX beam sweep configuration associated with the selected next RAR message, sending the next RAR control message to the MMW repeater, and sending the selected next RAR message to the MMW repeater.

In some aspects, the different TX beam sweep configuration associated with the selected next RAR message may generate a narrower beam than a beam generated by the different TX beam sweep configuration associated with the selected initial RAR message. In some aspects, the different TX beam sweep configuration associated with a first of the series of RAR messages to be sent according to the beam sweep schedule may generate a same beam as used by the MMW repeater to receive the RACH 1 message or forward an SSB.

In some aspects, the different TX beam sweep configurations indicated in the beam sweep schedule may be determined based at least in part on an attribute of the RACH 1 message. In some aspects, the attribute of the RACH 1 message may be a received power of the RACH 1 message or a received timing of the RACH 1 message. In some aspects, the attribute of the RACH 1 message is determined by the gNB. In some aspects, the attribute of the RACH 1 message is indicated to the gNB by the MMW repeater.

Various aspects may further include receiving an RAR control message from a network device indicating a beam sweep schedule, wherein the beam sweep schedule indicates a series of RAR messages to be sent successively and a different TX beam sweep configuration to be used by the MMW repeater for each of the series of RAR messages, receiving the series of RAR messages from the gNB, and controlling one or more TX antennas of the MMW repeater according to the RAR control message to successively relay each of the series of RAR messages using that RAR message's respective different TX beam sweep configuration.

Various aspects may further include receiving a cancelation message from the network device, and canceling the relay of any remaining RAR messages in the beam sweep schedule in response to receiving the cancelation message. In some aspects, the different TX beam sweep configuration associated with a first of the series of RAR messages relayed according to the beam sweep schedule may generate a same beam as used by the MMW repeater to receive a RACH 1 message or forward an SSB. In some aspects, the network device may be a gNB.

Various aspects may further include receiving an indication of a suitable beam for communicating with a computing device and relaying a message 4 to the computing device using the suitable beam.

Various aspects may further include receiving an initial RAR control message indicating an initial TX beam sweep configuration associated with an initial RAR message, receiving the initial RAR message, controlling one or more TX antennas of the MMW repeater according to the initial RAR control message to relay the initial RAR message using the initial TX beam sweep configuration, receiving a next RAR control message indicating a next TX beam sweep configuration associated with a next RAR message, receiving the next RAR message, and controlling one or more TX antennas of the MMW repeater according to the next RAR control message to relay the next RAR message using the next TX beam sweep configuration. In some aspects, the next TX beam sweep configuration may generate a narrower beam than a beam generated by the initial TX beam sweep configuration. In some aspects, the beam generated by the initial TX beam sweep configuration may be a same beam as used by the MMW repeater to receive a RACH 1 message or forward an SSB. Various aspects may further include receiving an indication of a suitable beam for communicating with a computing device and relaying a message 4 to the computing device using the suitable beam.

Further aspects may include a computing device having a processing device configured to perform one or more operations of any of the methods summarized above. Further aspects may include a processing device configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip processing device for use in a computing device configured to perform one or more operations of any of the methods summarized above. Further aspects include a system in a package processing device that includes two systems on chip for use in a computing device and is configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
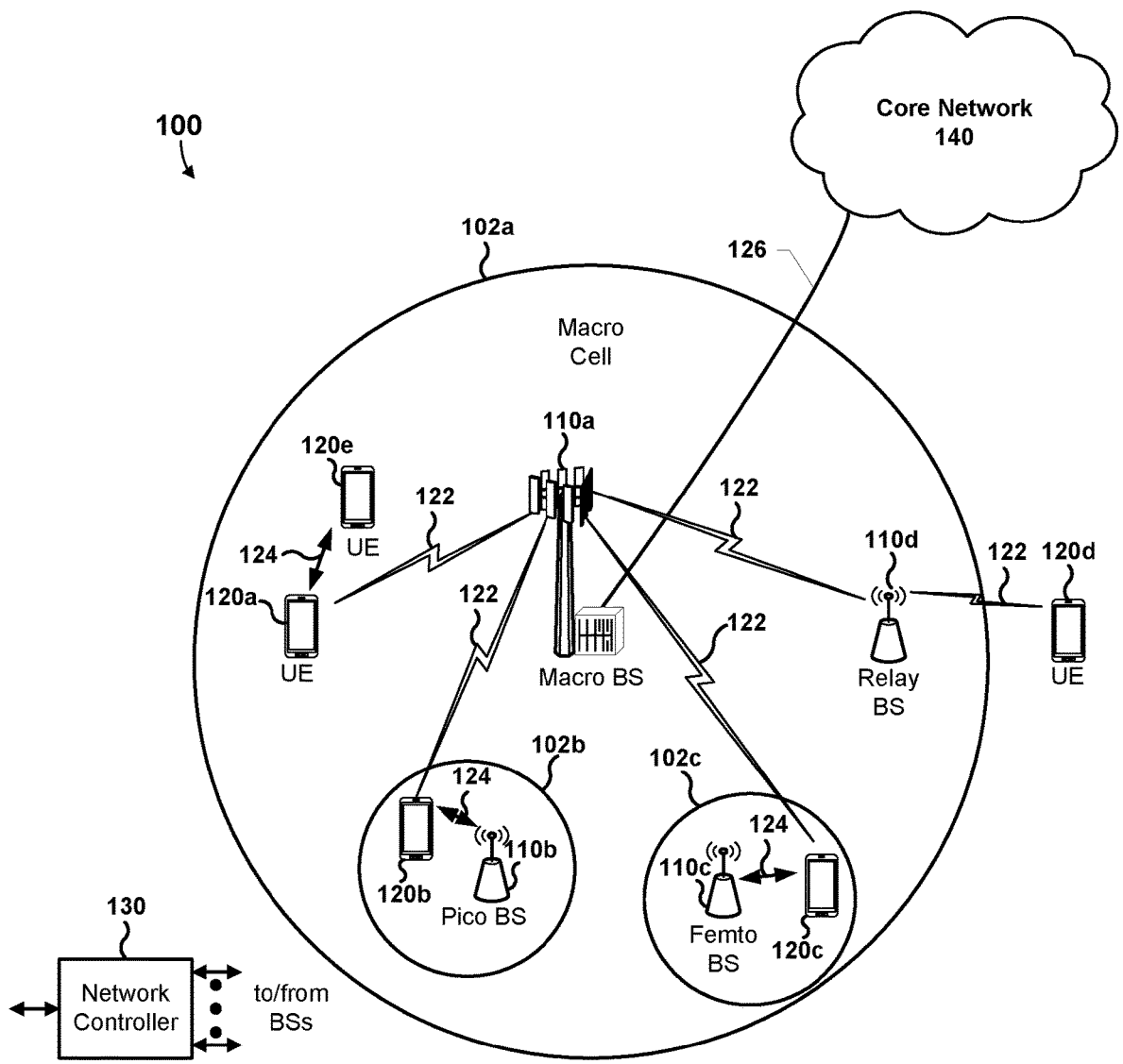
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cellular communication network devices, wireless router devices, wireless appliances, medical devices and equipment, biometric sensors/devices, wearable devices including smart watches, smart clothing, smart glasses, smart wristbands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The 3rd Generation Partnership Project (3GPP) defines various protocols that support transmissions in wireless networks, such as third generation wireless mobile communication technologies (3G) (e.g., global system for mobile communications (GSM) evolution (EDGE) systems, etc.), fourth generation wireless mobile communication technologies (4G) (e.g., long term evolution (LTE) systems, LTE-Advanced systems, etc.), fifth generation wireless mobile communication technologies (5G) (5G New Radio (NR) (5G NR) systems, etc.), etc. All of the wireless signals associated with various 3GPP protocols face issues with radio signal blockage. However, signal blockage is an especially challenging problem faced in high frequency communications, such as 5G communications using millimeter wave (MMW) signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.).

MMW repeaters may be used in wireless networks to mitigate signal blockage for 5G communications using MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). MMW repeaters may provide protections against signal blockage, may extend MMW coverage, and may fill in MMW coverage holes in a wireless network.

In NR, a 5G cell, such as a Next Generation NodeB (gNB), may periodically transmit synchronization signal blocks (SSBs) and system information (SI) (e.g., remaining minimum SI (RMSI), which is also referred to as a system information block (SIB) 1. Such information may be transmitted by using beam-sweeping. Following each transmit operation, the 5G cell (e.g., a gNB) may perform one or more receive operations to listen for and receive random access channel (RACH) messages from a UE computing device, such as an RACH 1 message (also referred to as RACH message (MSG) 1 (RACH MSG 1) or message 1 (MSG 1) in NR access procedures). Such receive operations to listen for a RACH message from a UE computing device, such as a RACH 1 message (RACH message 1 or MSG 1), may be referred to as a RACH occurrence (RO). A UE computing device receiving the SSBs and SI (e.g., RMSI) from the 5G cell (e.g., a gNB) may attempt random access with the 5G cell (e.g., a gNB) by sending a RACH 1 message (RACH message 1 or MSG 1). In response to the 5G cell (e.g., a gNB) successfully receiving an RACH 1 message (RACH message 1 or MSG 1) from a UE computing device, the 5G cell (e.g., a gNB) may send a random access response (RAR) message, such as an RACH 2 message (also referred to as an MSG 2 in NR access procedures), to the UE computing device. Further transmit and receive operations between the 5G cell (e.g., a gNB) and the UE computing device may be performed (e.g., transmit and reception of MSG 3, MSG 4, etc.) to enable wireless network access for the UE computing device via the 5G cell (e.g., a gNB).

In network configurations in which one or more repeaters, such as one or more MMW repeaters, are connected to a 5G cell (e.g., a gNB), the one or more repeaters, may be configured to relay the various synchronization signals (e.g., SSBs, SI, etc.) and messages (e.g., RACH MSG 1, RACH MSG 2 (RAR message), MSG 3, MSG 4, etc.) used in the NR access procedure between the UE computing device and the 5G cell (e.g., a gNB). As examples, the MMW repeater may relay an RACH MSG 1 from a UE computing device to a gNB, the MMW repeater may relay an RAR message from the gNB to the UE computing device, the MMW repeater may relay the MSG 3 from the UE computing device to the gNB, and/or the MMW repeater may relay an MSG 4 indicating a suitable beam for communicating between the UE and gNB from the gNB to the UE computing device.

Various embodiments may enable MMW repeaters to support access procedures for UE computing devices in NR. Various embodiments include methods, systems, and devices for beam sweep configuration of an MMW repeater in a 5G network during RACH procedures, such as RACH procedures to exchange RAR messages, MSG 3s, and MSG 4s between gNBs and UE computing devices via an MMW repeater. Various embodiments may enable a gNB to provide an MMW repeater with one or more transmit (TX) beam configurations for use in forwarding RACH message 2s (RAR messages) from the gNB to a UE computing device. In some embodiments, the configuration may be dynamically determined and indicated to the MMW repeater along with controls signals that instruct the MMW repeater to forward one or more RAR messages. The control signals may enable the gNB to control resources of the MMW repeater, such as TX power settings, TX beam form settings, etc. In some embodiments, the configuration may be semistatically determined and indicated to the MMW repeater. In some embodiments, the configuration may be periodic and/or semi-persistent.

Various embodiments may include receiving a RACH message 1 from an MMW repeater at a gNB. The RACH message 1 may be relayed by the MMW repeater from a UE computing device. The UE computing device may have sent the RACH message 1 in response to an SSB sent by the gNB and relayed by the MMW repeater to the UE computing device. The MMW repeater may have relayed the SSB to the UE computing device using a beam form (e.g., a TX beam form), such as an omni-directional or pseudo-omni directional beam, and may have received an RACH message 1 in response from the UE computing device using a beam form (e.g., a receive (RX) beam form), such as the same omni-directional or pseudo-omni directional beam used to relay the SSB.

Various embodiments may include determining a beam sweep schedule for use by the MMW repeater in relaying a random access response (RAR) message in response to the RACH 1 message. In various embodiments, the beam sweep schedule may indicate a series of RAR messages to be sent successively and a different TX beam sweep configuration to be used by the MMW repeater for each of the series of RAR messages. Similarly, the beam sweep schedule may indicate a series of RX beam sweep configurations to be used by the MMW repeater to receive (or listen for) MSG 3s sent by a UE computing device in response to the RAR messages. In various embodiments, the TX beam sweep configuration for the RAR message relay may be the same as the RX beam sweep configuration to receive (or listen for) MSG 3s.

In various embodiments, the different TX beam sweep configurations indicated in the beam sweep schedule may be determined based at least in part on an attribute of the RACH 1 message. For example, the power of the RACH 1 message and/or the timing of the RACH 1 message may be used to determine the beam sweep schedule. The received power of the RACH 1 message may be calculated by the gNB based on the forwarded RACH message 1 or the received power of the RACH 1 message may be calculated by the MMW repeater and forwarded to the gNB by the MMW repeater, such as via a control interface.

In various embodiments, the received timing of the RACH 1 message may be calculated by the gNB based on the forwarded RACH message 1 or the received timing of the RACH 1 message may be calculated by the MMW repeater and forwarded to the gNB by the MMW repeater, such as via a control interface.

In various embodiments, RAR control messages may be sent from the gNB to the MMW repeater to indicate one or more beam sweep settings, TX power settings, RX power settings, and/or other MMW repeater settings. In various embodiments, an RAR control message may indicate the determined beam sweep schedule. Indicating the beam sweep schedule may enable the MMW repeater to use the beam sweep schedule to send multiple RAR messages in an RAR window. In various embodiments, an RAR control message may be sent from the gNB to the MMW relay via a control interface, such as via in-band and/or out-of-band interfaces. In some embodiments, an RAR control message may indicate a single beam sweep configuration. In some embodiments, an RAR control message may indicate multiple beam sweep configurations. In some embodiments, an RAR control message may indicate one or more conditions to control a relay of an MSG 3 by an MMW repeater. For example, a condition may be an indication to use the same beam to relay the MSG 3 as was used to transmit the RAR message that triggered the MSG 3.

In various embodiments, a beam sweep schedule may operate as instructions to an MMW repeater to forward received RAR messages from the gNB using one or multiple TX beams. In some embodiments, the TX beam may be a finer beam (e.g., with a greater beam gain) than the RX beam the MMW repeater used to receive the RACH message 1 from a UE computing device and/or a finer beam (e.g., with a greater beam gain) than the TX beam the MMW repeater used to transmit an SSB that may have triggered the RACH message 1 transmission by the UE computing device. In some embodiments, the one or more TX beams may be beams that are quasi co-located (QCLed) with the RX beam the MMW repeater used to receive the RACH message 1 from a UE computing device and/or that are QCLed the TX beam the MMW repeater used to transmit an SSB that may have triggered the RACH message 1 transmission by the UE computing device. In various embodiments, the beam sweep schedule may also configure the MMW repeater's RX beam form for receiving (or listening for) MSG 3 to be the same as the TX beam form used to transmit the RAR message.

In various embodiments, based on a relayed MSG 3 from the MMW repeater, the gNB may determine a suitable beam for the gNB and MMW repeater to use to communicate with the UE computing device. The gNB may instruct the MMW repeater to use the suitable beam for forwarding an MSG 4 to the UE computing device. In some embodiments, the gNB may send an indication of the suitable beam to the MMW repeater. In some scenarios, multiple RAR messages and MSG 3s may be overlapping. As such, before all the RAR messages associated with a beam sweep schedule may have been sent, a suitable beam for UE computing device communications may have been determined by the gNB. In such scenarios, in various embodiments, the gNB may generate and send a cancelation message to the MMW repeater. The cancelation message may be configured to cause the MMW repeater to cancel any remaining RAR messages in the beam sweep schedule. In various embodiments, a gNB may send an MSG 4 to the MMW repeater and the MMW repeater may relay the MSG 4 to the UE computing device using the suitable beam.

In various embodiments, a gNB may send one or multiple RAR messages one by one (e.g., sequentially). In such embodiments, the gNB may generate an RAR control message for an initial RAR message according to a beam sweep schedule. The initial RAR control message may indicate the TX beam sweep configuration associated with a selected initial RAR message. In some embodiments, the TX beam sweep configuration for an initial RAR message may be the same beam the MMW repeater used to receive the RACH message 1 from a UE computing device (e.g., the initial TX beam may correspond to the RX beam on which the RACH message 1 was received by the MMW repeater) and/or may be the same beam the MMW repeater used to transmit an SSB that may have triggered the RACH message 1 transmission by the UE computing device (e.g., the initial TX beam may correspond to the TX beam on which the SSB was transmitted by the MMW repeater). The initial RAR message may also configure the MMW repeater's RX beam form for receiving (or listening for) MSG 3 to be the same as the TX beam form used to transmit the initial RAR message.

In various embodiments, the gNB may determine whether an MSG 3 is relayed by the MMW repeater. In response to determining, no MSG 3 has been relayed by the MMW repeater, the gNB may select a next RAR message of the series of RAR messages to send. The gNB may generate a next RAR control message indicating the TX beam sweep configuration associated with the next RAR message. The gNB may send the next RAR control message and the next RAR message to the MMW repeater. In some embodiments, the TX beam sweep configuration for the next RAR message may be a finer beam than that generated by the initial RAR control message. In response to determining that the MSG 3 is relayed by the MMW repeater, the gNB may determine a suitable beam for the gNB and MMW repeater to use to communicate with the UE computing device. The gNB may instruct the MMW repeater to use the suitable beam for forwarding an MSG 4 to the UE computing device. In various embodiments, the gNB may send an indication of the suitable beam for communicating with the UE computing device to the MMW repeater. In some embodiments, the suitable beam may be the beam used to relay the RAR message that resulted in the MSG 3 being received from the UE computing device. In various embodiments, the MMW repeater may receive an indication of a suitable beam for communicating with the UE computing device. The MMW repeater may relay an MSG 4 from the gNB to the UE computing device using the suitable beam. For example, the MMW repeater may control one or more antennas to send an MSG 4 received from the gNB to the UE computing device using the suitable beam.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with computing devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The computing device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other computing devices. In the example illustrated in FIG. 1, a relay station 110d may communicate with macro the base station 110a and the computing device 120d in order to facilitate communication between the base station 110a and the computing device 120d. A relay station also may be referred to as a relay base station, a relay base station, a relay, a repeater, etc.

As a specific example, one type of relay BS 110d may be a millimeter wave (MMW) repeater. An MMW repeater (e.g., relay BS 110d) may relay MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.) between MMW enabled devices, such as between a gNB (e.g., macro BS 110a) and a computing device 120d. An MMW repeater (e.g., relay BS 110d) may provide protection against blockage of an MMW cell, such as a gNB (e.g., macro BS 110a), extend the coverage of the MMW cell, such as a gNB (e.g., macro BS 110a), and/or fill in coverage holes of the MMW cell, such as a gNB (e.g., macro BS 110a).

An MMW repeater (e.g., relay BS 110d) may receive one or more signals on or more of its receiver (RX) antennas based on one or more RX beamforming configurations, amplify the power of the one or more received signals, and transmit the one or more amplified signals from one or more of its transmitter (TX) antennas based on one or more TX beamforming configurations. An MMW repeater (e.g., relay BS 110d) may also exchange one or more control signals with other network devices (e.g., macro BS 110a, network controller 130, donor nodes, control nodes, servers, etc.) via one or more control interfaces. A control interface may be an out-of-band interface using a different radio technology, such as Bluetooth, Bluetooth Low Energy (LE), etc., and/or a different frequency (e.g., the frequencies designated for LTE narrowband internet of things (NB-IoT) (LTE NB-IoT). Additionally, or alternatively, a control interface may be an in-band interface using bandwidth of the same carrier frequency (e.g., bandwidth of MMW signals in a mmWave spectrum band).

In some configurations, an MMW repeater (e.g., relay BS 110d) may be a low power relay with less functionality than a gNB (e.g., macro BS 110a). For example, the MMW repeater (e.g., relay BS 110d) may receive analog signals on its RX antennas, amplify the power of the received analog signals, and transmit the amplified analog signals from its TX antennas. Such example reduced functionality MMW repeaters (e.g., relay BS 110d) may not include analog-to-digital converters or digital-to-analog converters in their signal paths. Such example reduced functionality MMW repeaters (e.g., relay BS 110d) may be referred to as Layer 1 (L1) and/or physical layer (PHY) repeaters.

In various embodiments, the RX beamforming configurations, TX beamforming configurations, and/or power amplification settings of the MMW repeater (e.g., relay BS 110d) may be controlled by a gNB (e.g., macro BS 110a) that the MMW repeater may be supporting and/or another network device (e.g., network controller 130, donor nodes, control nodes, servers, etc.).

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The computing devices (UE computing devices) 120a, 120b, 120c may be dispersed throughout communications system 100, and each computing device may be stationary or mobile. A computing device also may be referred to as an access terminal, a UE, a terminal, a mobile station, a subscriber unit, a station, etc.

A macro base station 110a may communicate with the communication network 140 over a wired or wireless communication link 126. The computing devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per computing device. Multi-layer transmissions with up to 2 streams per computing device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A computing device 120a-e may be included inside a housing that houses components of the computing device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the computing device 120a and the computing device 120e) may communicate directly using one or more sidelink channels 124 (for example, without using a base station 110a-110d as an intermediary to communicate with one another). For example, the computing devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the computing device 120a-e may perform scheduling operations, resource selection operations, as well as other operations described elsewhere herein as being performed by the base station 110a.

Figure 2:
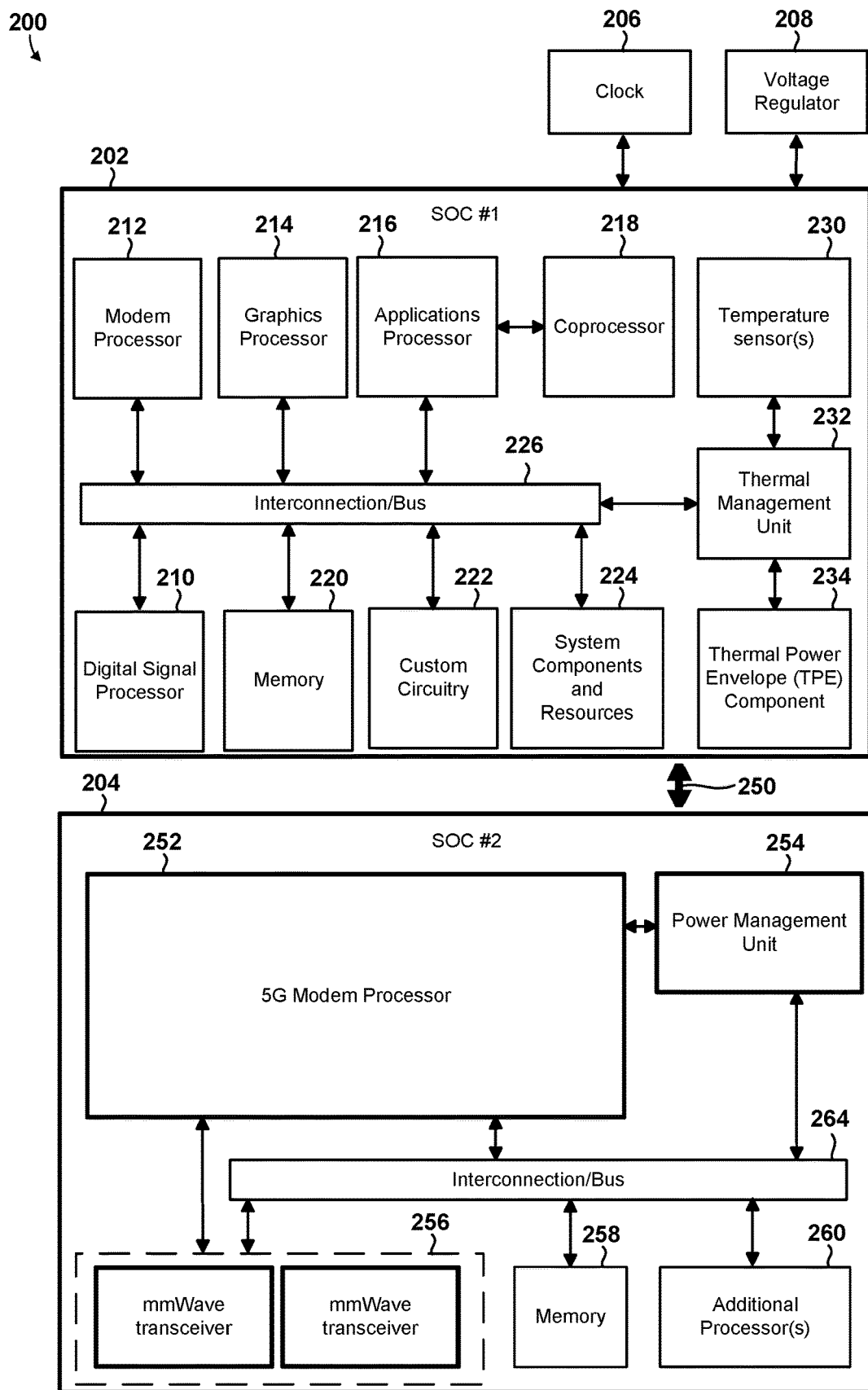
FIG. 2 is a component block diagram illustrating a computing system that may be configured to implement beam sweep configuration of a millimeter wave (MMW) repeater in accordance with various embodiments.

Various embodiments may be implemented on a number of single processor and multiprocessor processing devices, including a system-on-chip (SOC) or system in a package (SIP), which may be use in a variety of computing devices. FIG. 2 illustrates an example processing device or SIP 200 architecture that may implement various embodiments and be used in computing devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
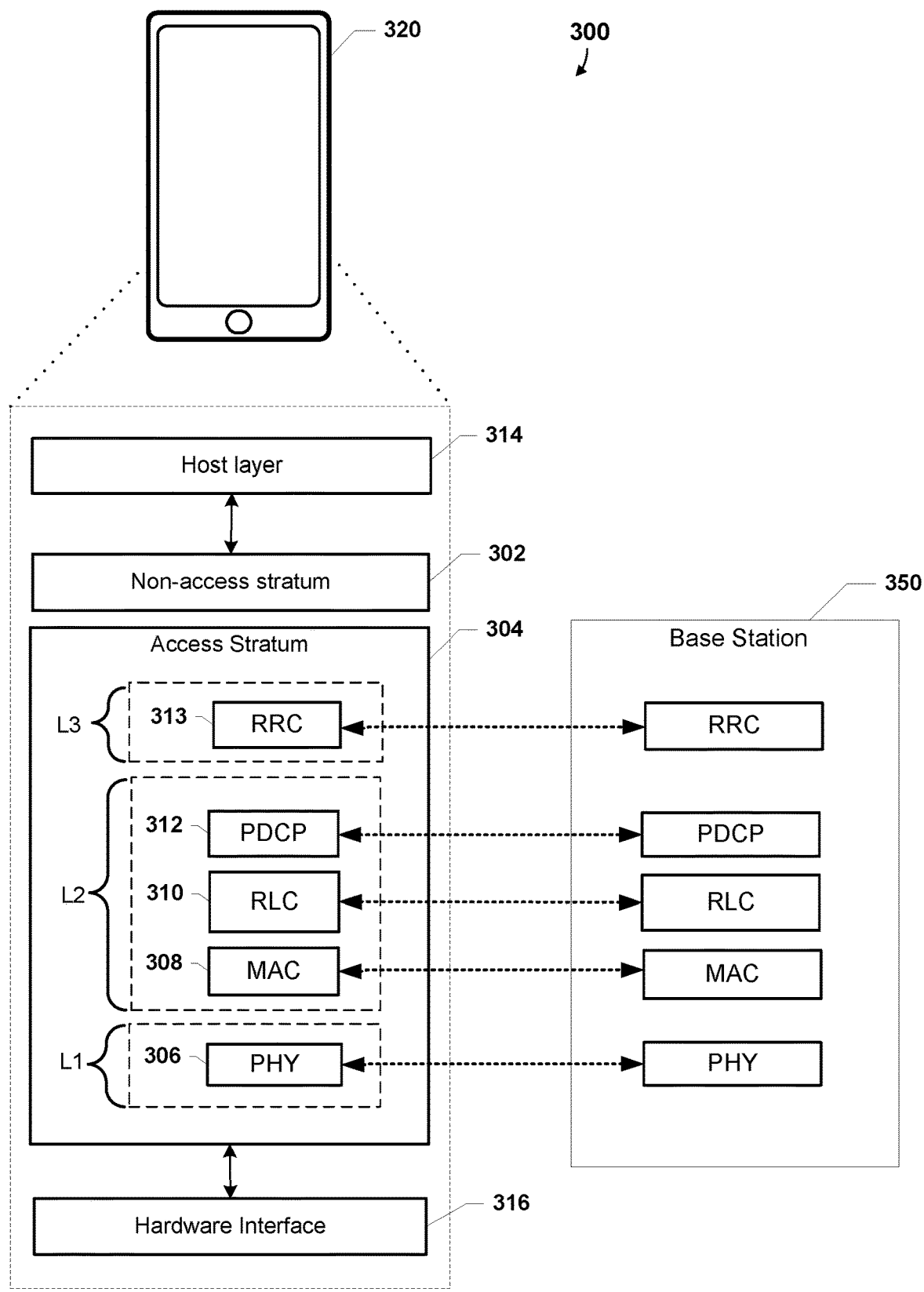
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a computing device (UE computing device) 320 (e.g., the computing device 120a-120e, 200). The wireless communications between the base station 350 (e.g., the base station 110a) and the computing device (UE computing device) 320 (e.g., the computing device 120a-120e, 200) may be direct communications and/or may be communications via a relay, such as an MMW repeater (e.g., the relay BS 110d).

With reference to FIGS. 1-3, the computing device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the computing device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the computing device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression. In various embodiments, the PDCP sublayer 312 encode packets for transmission via lower layers and/or decode packets received from low layers and destined for higher layers.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the computing device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
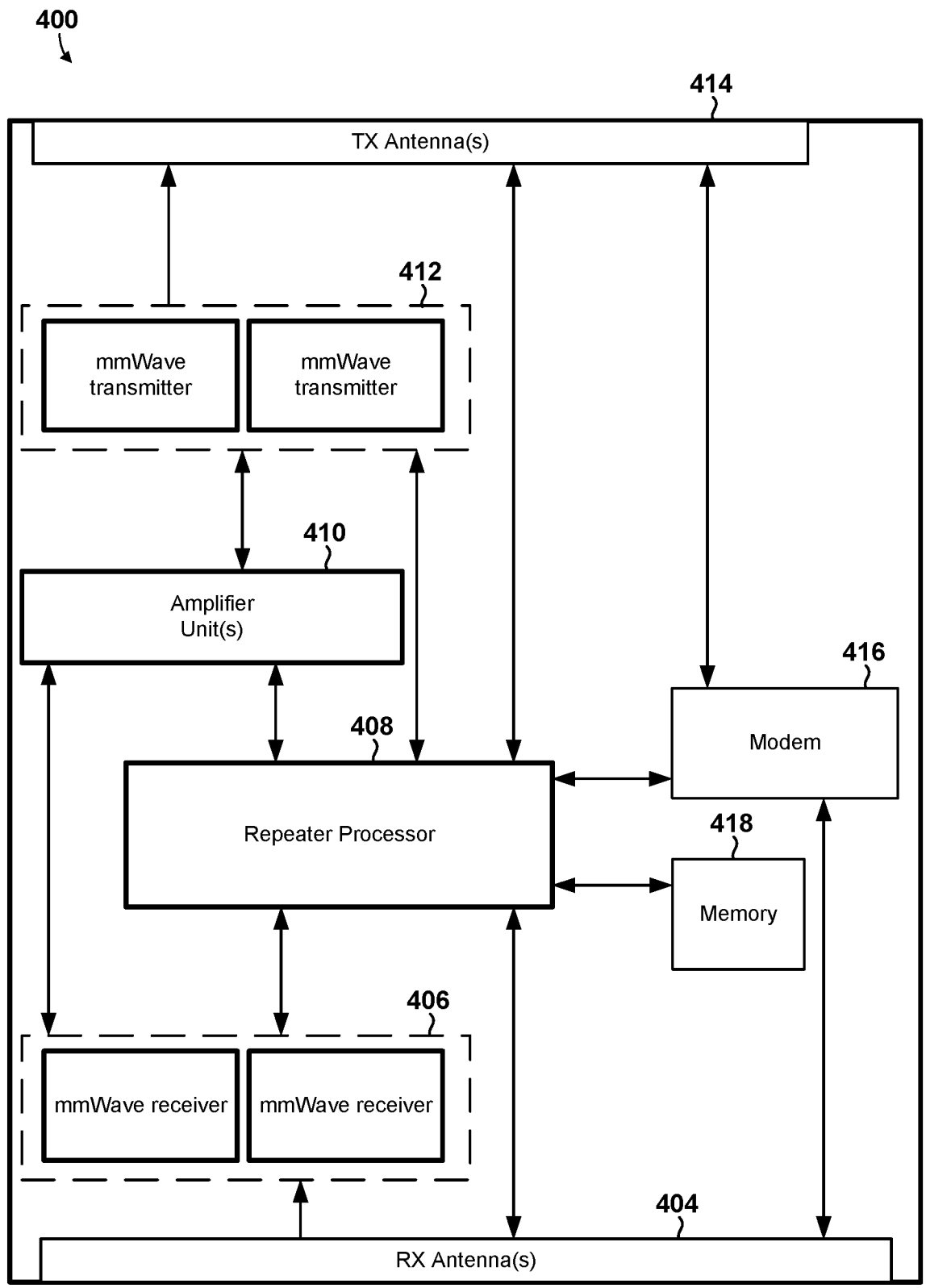
FIG. 4 is a component block diagram illustrating an example MMW repeater configured to implement beam sweep configuration in accordance with various embodiments.

Various embodiments may be implemented on a repeater (e.g., BS relay 110d), such as an MMW repeater. FIG. 4 illustrates a simplified architecture of an example MMW repeater 400 that may implement various embodiments.

With reference to FIGS. 1-4, the illustrated example MMW repeater 400 may include one or more RX antennas 404, one or more mmWave receivers 406, a repeater processor 408, one or more amplifier units 410, one or more mmWave transmitters 412, one or more TX antennas 414, a memory 418, and one or more modem 416, such as an LTE modem, 5G modem, etc.

The one or more RX antennas 404 may be connected to the one or more mmWave receivers 406 to receive MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). The one or more TX antennas 414 may be connected to the one or more mmWave transmitters 412 to send MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). The one or more TX antennas 414 and/or the one or more RX antennas 404 may be array type antennas, such as phased array antennas, configured to support beamforming and/or MIMO transmission/reception.

The one or more amplifier units 410 may amplify the power of MMW signals received via the one or more RX antennas and the one or more mmWave receivers 406 and transmit the one or more amplified MMW signals via the one or more mmWave transmitters 412 and one or more TX antennas 414. In some configurations, the MMW repeater 400 may be a low power relay with less functionality than a gNB (e.g., macro BS 110a). For example, the MMW repeater 400 may receive analog signals on its RX antennas 404 and mmWave receivers 406, amplify the power of the received analog signals via its amplifier units 410, and transmit the amplified analog signals from its mmWave transmitters 412 and TX antennas 414. Such reduced functionality MMW repeaters may not include analog-to-digital converters or digital-to-analog converters in their signal paths. Such example reduced functionality MMW repeaters may be referred to as Layer 1 (L1) and/or physical layer (PHY) repeaters.

A repeater processor 408 may be connected to the one or more RX antennas 404, the one or more mmWave receivers 406, the one or more amplifier units 410, the one or more mmWave transmitters 412, and/or the one or more TX antennas 414 to control the operations of the one or more RX antennas 404, the one or more mmWave receivers 406, the one or more amplifier units 410, the one or more mmWave transmitters 412, and/or the one or more TX antennas 414. For example, the repeater processor 408 may control the one or more RX antennas and/or the one or more mmWave receivers 404 to receive analog MMW signals with one or more RX beamforming configurations. For example, the repeater processor 408 may control the one or more amplifier units to amplify analog MMW signals. For example, the repeater processor 408 may control the one or more mmWave transmitters 412 and/or the one or more TX antennas 414 to transmit amplified analog MMW signals with on one or more TX beamforming configurations. The repeater processor 408 may control the one or more RX antennas 404, the one or more mmWave receivers 406, the one or more amplifier units 410, the one or more mmWave transmitters 412, and/or the one or more TX antennas 414 to enable transmission and/or reception over the air interface thereby relaying Layer 1 (L1) services such as physical layer (PHY) services.

The MMW repeater 400 may also exchange one or more control signals with other network devices (e.g., macro BS 110a, network controller 130, donor nodes, control nodes, servers, etc.) via one or more control interfaces. A control interface may be an out-of-band interface using a different radio technology, such as Bluetooth, Bluetooth Low Energy (LE), etc., and/or a different frequency (e.g., the frequencies designated for LTE narrowband internet of things (NB-IoT) (LTE NB-IoT). For example, the control interface may be established via out-of-band communications established with the a gNB (e.g., macro BS 110a) using the modem 416. Additionally, or alternatively, a control interface may be an in-band interface using bandwidth of the same carrier frequency (e.g., bandwidth of MMW signals in a mmWave spectrum band). For example, communications over a control channel via the one or more RX antennas 404, the one or more mmWave receivers 406, the one or more amplifier units 410, the one or more mmWave transmitters 412, and/or the one or more TX antennas 414 with a gNB (e.g., macro BS 110a) may be used to establish an in-band control interface.

Whether in-band and/or out-of-band, a control interface may be used by another network device (e.g., macro BS 110a, network controller 130, donor node, control node, server, etc.) to control TX beamforming configurations, RX beamforming configurations, and/or power amplification configurations of the MMW repeater 400 by sending instruction (e.g., setting indications, etc.) to the repeater processor 408. For example, a gNB (e.g., macro BS 110a) may send a message to the repeater processor 408 of the MMW repeater 400 via a control interface that instructions the repeater processor 408 of the MMW repeater 400 to control the one or more RX antennas 404, the one or more mmWave receivers 406, the one or more amplifier units 410, the one or more mmWave transmitters 412, and/or the one or more TX antennas 414 to achieve selected TX beamforming configurations, RX beamforming configurations, and/or power amplification configurations at the MMW repeater 400.

Figure 5:
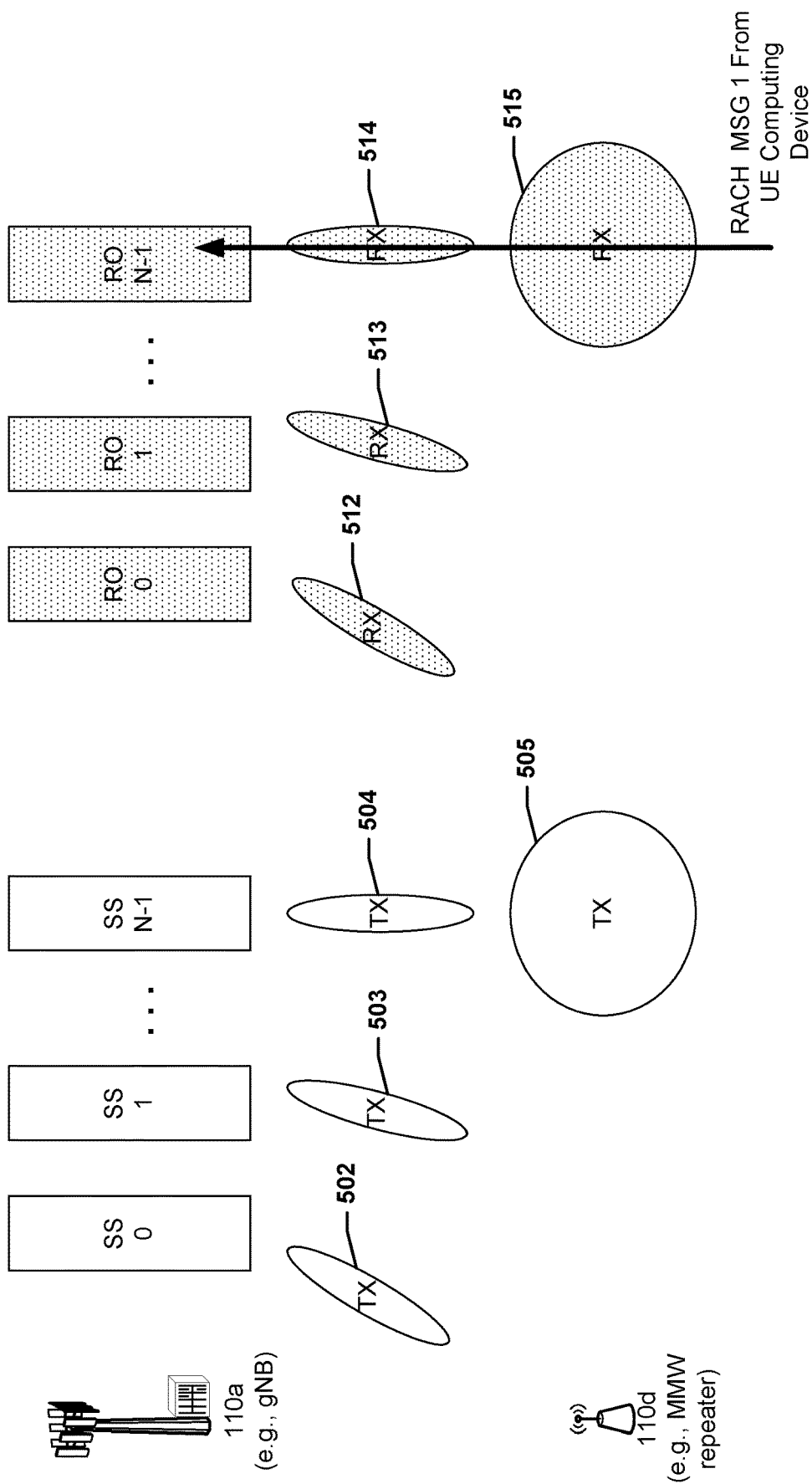
FIG. 5 is a block diagram of an example beam sweep configuration of an MMW repeater.

FIG. 5 is a block diagram of an example beam sweep configuration of an MMW repeater, such as a relay BS 110d, by a gNB, such as macro BS 110a, in a 5G network for supporting RACH procedures using NR. With reference to FIGS. 1-5, the gNB may generate and send a RACH configuration message to the MMW repeater indicating a TX beam form 505 and a RX beam form 515 to use during RACH procedures. The RACH configuration message may be sent over a control interface, such as an in-band interface or an out-of-band interface, between the gNB and MMW repeater. The RACH configuration message may indicate the number "N" SSBs in use by the gNB, may indicate the periods of the SSBs, such as SS0, SS1, through SSN−1, etc., may indicate the number "N" of ROs in use by the gNB, and may indicate the periods of the ROs, such as RO0, RO1, through RON−1, etc. The RACH configuration message may associate SSBs, such as SS0, SS1, through SSN−1, etc., with corresponding ROs, such as RO0, RO1, through RON−1, etc. The RACH configuration message may indicate the TX beam form the MMW repeater is to use during a specific SSB, such as TX beam form 505 during SSB SSN−1. The RACH configuration message may indicate the RX beam form the MMW repeater is to use during a specific RO, such as RX beam form 515 during RO RON−1.

During RACH procedures, the gNB may transmit SI using different TX beam forms 502, 503, and 504 during respective SSBs, SS0, SS1, SSN−1, etc., and may receive (or listen for) RACH messages, such as RACH message 1, using different RX beam forms 512, 513, 514, etc. The MMW repeater may relay SI from the gNB by transmitting any received SI from the gNB using TX beam form 505 during the SSB SSN−1, thereby relaying such SI using TX beam form 505 as specified in the RACH configuration message. Similarly, the MMW repeater may relay any RACH message 1 received from a UE computing device by using a RX beam 515 to receive (or listen for) any RACH message is during the RO RON−1.

In response to receiving a RACH message 1 relayed by the MMW repeater to the gNB, the gNB may generate an RAR message. The RAR message may be replayed to the UE computing device via the MMW repeater using a TX beam form, such as TX beam form 505 and/or one or more different TX beam forms. A UE computing device receiving the RAR message may send an MSG 3 that may be relayed by the MMW repeater using a RX beam form, such as RX beam form 515 and/or one or more different RX beam forms. In response to receiving an MSG 3 relayed by the MMW repeater, the gNB may determine a suitable beam for communication with the UE computing device and may relay an MSG 4 to the UE computing device via the MMW repeater using the suitable beam. In this manner, RACH procedures may establish communications between the gNB and a UE computing device via the MMW repeater.

Figure 6:
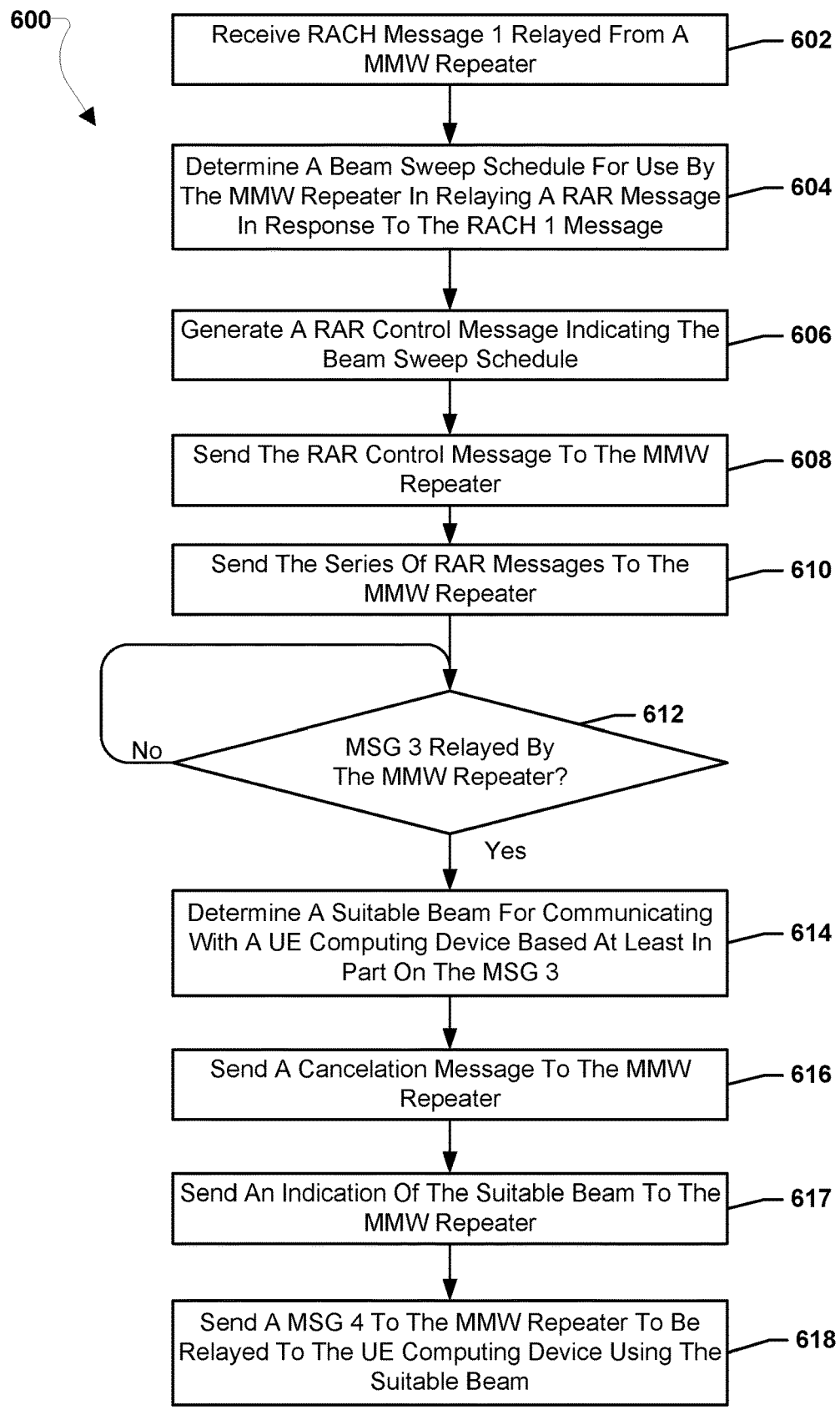
FIG. 6 is a process flow diagram illustrating a method for beam sweep configuration of an MMW repeater according to an embodiment.

FIG. 6 is a process flow diagram illustrating a method for beam sweep configuration of an MMW repeater according to an embodiment. With reference to FIGS. 1-6, the method 600 may be implemented by a processor of network device, such as a base station (e.g., the base station 110a (e.g., a gNB), 350), network controller 130, donor nodes, control nodes, servers, etc.

In block 602, the processor may receive a RACH message 1 relayed from an MMW repeater. The RACH message 1 may be relayed by the MMW repeater from a UE computing device. The UE computing device may have sent the RACH message 1 in response to an SSB sent by the gNB and relayed by the MMW repeater to the UE computing device. The MMW repeater may have relayed the SSB to the UE computing device using a beam form (e.g., a TX beam form), such as an omni-directional or pseudo-omni directional beam, and may have received an RACH message 1 in response from the UE computing device using a beam form (e.g., a receive (RX) beam form), such as the same omni-directional or pseudo-omni directional beam used to relay the SSB.

In block 604, the processor may determine a beam sweep schedule for use by the MMW repeater in relaying an RAR message in response to the RACH 1 message. In various embodiments, the beam sweep schedule may indicate a series of RAR messages to be sent successively and a different TX beam sweep configuration to be used by the MMW repeater for each of the series of RAR messages. Similarly, the beam sweep schedule may indicate a series of RX beam sweep configurations to be used by the MMW repeater to receive (or listen for) MSG 3s sent by a UE computing device in response to the RAR messages. In various embodiments, the TX beam sweep configuration for the RAR message relay may be the same as the RX beam sweep configuration to receive (or listen for) MSG 3s. In various embodiments, the different TX beam sweep configurations indicated in the beam sweep schedule may be determined based at least in part on an attribute of the RACH 1 message. For example, the power of the RACH 1 message and/or the timing of the RACH 1 message may be used to determine the beam sweep schedule. The received power of the RACH 1 message may be calculated by the gNB based on the forwarded RACH message 1 or the received power of the RACH 1 message may be calculated by the MMW repeater and forwarded to the gNB by the MMW repeater, such as via a control interface. The received timing of the RACH 1 message may be calculated by the gNB based on the forwarded RACH message 1 or the received timing of the RACH 1 message may be calculated by the MMW repeater and forwarded to the gNB by the MMW repeater, such as via a control interface.

In block 606, the processor may generate an RAR control message indicating the beam sweep schedule. In various embodiments, RAR control messages may be sent from the gNB to the MMW repeater to indicate one or more beam sweep settings, TX power settings, RX power settings, and/or other MMW repeater settings. In various embodiments, an RAR control message may indicate the determined beam sweep schedule. Indicating the beam sweep schedule may enable the MMW repeater to use the beam sweep schedule to send multiple RAR messages in an RAR window. In some embodiments, an RAR control message may indicate one or more conditions to control a relay of an MSG 3 by an MMW repeater. For example, a condition may be an indication to use the same beam to relay the MSG 3 as was used to transmit the RAR message that triggered the MSG 3.

In block 608, the processor may send the RAR control message to the MMW repeater. In various embodiments, an RAR control message may be sent from the gNB to the MMW relay via a control interface, such as via in-band and/or out-of-band interfaces. In some embodiments, an RAR message may indicate a single beam sweep configuration.

In block 610, the processor may send the series of RAR messages to the MMW repeater. In some embodiments, multiple RAR messages may be sent from the gNB at the same time and the MMW relay may sequentially send the RAR messages.

In determination block 612, the processor may determine whether an MSG 3 is relayed by the MMW repeater. For example, the processor may determine whether an MSG 3 is successfully received from the MMW repeater.

In response to determining that an MSG 3 has not been relayed (i.e., determination block 612="No"), the processor may continue to monitor for relay of an MSG 3 in determination block 612.

In response to determining that an MSG 3 is received (i.e., determination block 612="Yes"), the processor may determine a suitable beam for communicating with a UE computing device based at least in part on the MSG 3 in block 614. In various embodiments, based on a relayed MSG 3 from the MMW repeater, the gNB may determine a suitable beam for the gNB and MMW repeater to use to communicate with the UE computing device. The gNB may instruct the MMW repeater to use the suitable beam for forwarding an MSG 4 to the UE computing device.

In block 616, the processor may send a cancelation message to the MMW repeater. In some scenarios, multiple RAR messages and MSG 3s may be overlapping. As such, before all the RAR messages associated with a beam sweep schedule may have been sent, a suitable beam for UE computing device communications may have been determined by the gNB. In such scenarios, in various embodiments, the gNB may generate and send a cancelation message to the MMW repeater. The cancelation message may be configured to cause the MMW repeater to cancel any remaining RAR messages in the beam sweep schedule. In various embodiments, the cancelation message may be sent via a control interface, such as via in-band and/or out-of-band interfaces.

In block 617, the processor may send an indication of the suitable beam to the MMW repeater. In various embodiments, the indication may be sent from the gNB to the MMW relay via a control interface, such as via in-band and/or out-of-band interfaces.

In block 618, the processor may send an MSG 4 to the MMW repeater to be relayed to the UE computing device using the suitable beam. In various embodiments, a gNB may send an MSG 4 to the MMW repeater and the MMW repeater may relay the MSG 4 to the UE computing device using the suitable beam.

Figure 7:
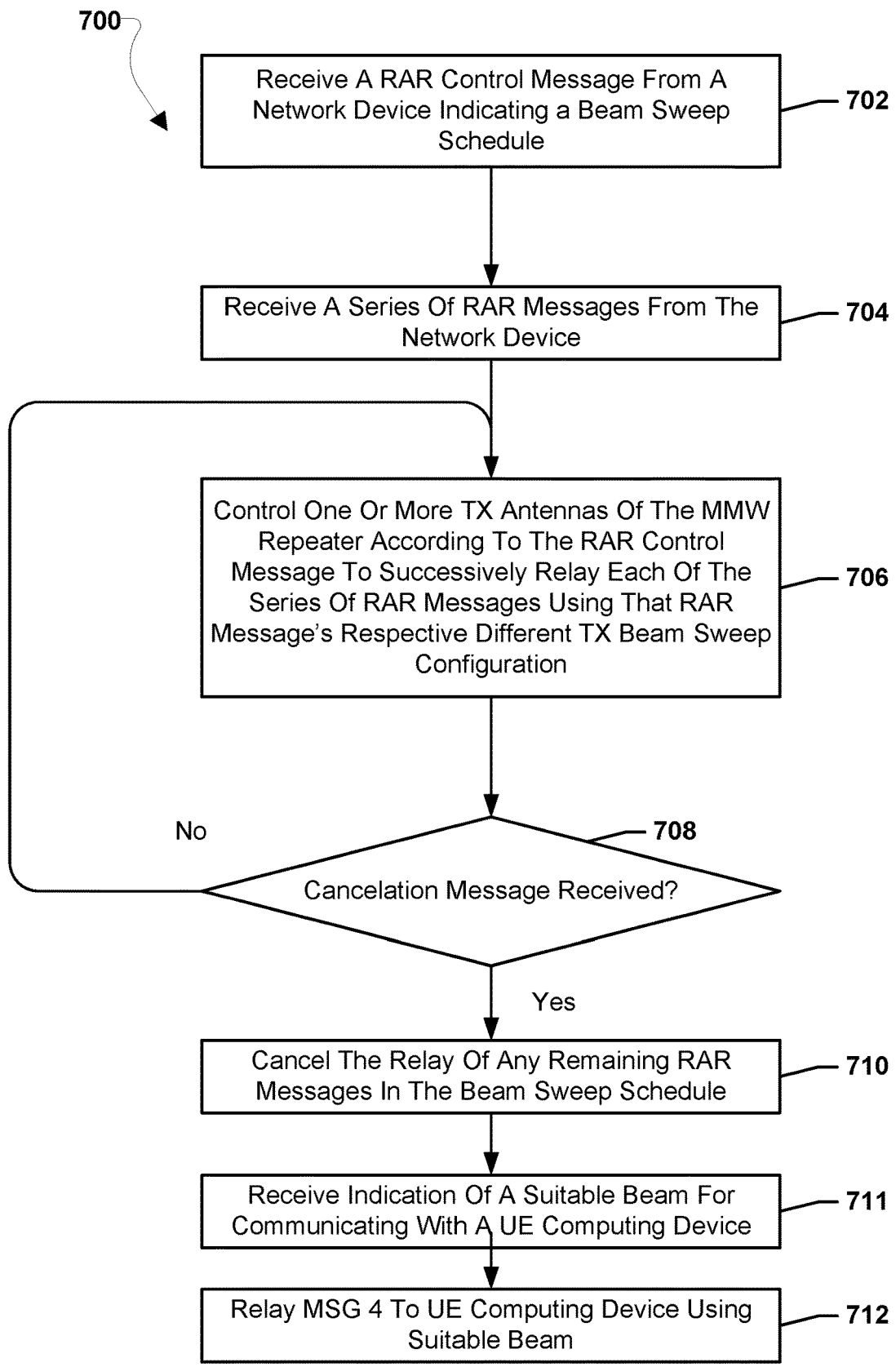
FIG. 7 is a process flow diagram illustrating a method for beam sweep configuration of an MMW repeater according to an embodiment.

FIG. 7 is a process flow diagram illustrating a method for beam sweep configuration of an MMW repeater according to an embodiment. With reference to FIGS. 1-7, the method 700 may be implemented by a processor of a relay base station (e.g., the base station 110d, the MMW repeater 400). In various embodiments, the operations of method 700 may be performed in conjunction with the operations of the method 600 as described.

In block 702, the processor may receive an RAR control message from a network device (e.g., a gNB) indicating a beam sweep schedule. In various embodiments, the beam sweep schedule may indicate a series of RAR messages to be sent successively and a different TX beam sweep configuration to be used by the MMW repeater for each of the series of RAR messages. Similarly, the beam sweep schedule may indicate a series of RX beam sweep configurations to be used by the MMW repeater to receive (or listen for) MSG 3s sent by a UE computing device in response to the RAR messages. In various embodiments, RAR control messages may be sent from the gNB to the MMW repeater to indicate one or more beam sweep settings, TX power settings, RX power settings, and/or other MMW repeater settings. In various embodiments, an RAR control message may indicate the determined beam sweep schedule. Indicating the beam sweep schedule may enable the MMW repeater to use the beam sweep schedule to send multiple RAR messages in an RAR window.

In block 704, the processor may receive a series of RAR messages from the network device (e.g., the gNB). In some embodiments, a network device, such as a gNB, may send multiple RAR messages at the same time to an MMW repeater.

In block 706, the processor may control one or more TX antennas of the MMW repeater according to the RAR control message to successively relay each of the series of RAR messages using that RAR message's respective different TX beam sweep configuration. In various embodiments, a beam sweep schedule may operate as instructions to an MMW repeater to forward received RAR messages from the gNB using one or multiple TX beams. In some embodiments, the TX beam may be a finer beam (e.g., with a greater beam gain) than the RX beam the MMW repeater used to receive the RACH message 1 from a UE computing device and/or a finer beam (e.g., with a greater beam gain) than the TX beam the MMW repeater used to transmit an SSB that may have triggered the RACH message 1 transmission by the UE computing device. In some embodiments, the one or more TX beams may be beams that are quasi co-located (QCLed) with the RX beam the MMW repeater used to receive the RACH message 1 from a UE computing device and/or that are QCLed the TX beam the MMW repeater used to transmit an SSB that may have triggered the RACH message 1 transmission by the UE computing device. In various embodiments, the beam sweep schedule may also configure the MMW repeater's RX beam form for receiving (or listening for) MSG 3 to be the same as the TX beam form used to transmit the RAR message.

In determination block 708, the processor may determine whether a cancelation message is received. In response to determining that a cancelation message is not received (i.e., determination block 708="No"), the processor may continue to control one or more TX antennas of the MMW repeater according to the RAR control message to successively relay each of the series of RAR messages using that RAR message's respective different TX beam sweep configuration in block 706.

In response to determining that a cancelation message is received (i.e., determination block 708="Yes"), the processor may cancel the relay of any remaining RAR messages in the beam sweep schedule in block 710. In this manner, resources may not be wasted on attempting relay of RAR messages and/or MSG 3s that may no longer be necessary to establish communications with the UE computing device.

In block 711, the processor may receive an indication of a suitable beam for communicating with a UE computing device. In various embodiments, the indication may be received from the gNB via a control interface, such as via in-band and/or out-of-band interfaces.

In block 712, the processor may relay an MSG 4 to the UE computing device using the suitable beam. In various embodiments, the MMW repeater may receive an indication of a suitable beam for communicating with the UE computing device. In response to receiving an MSG 4 from a gNB, the MMW repeater may relay the MSG 4 from the gNB to the UE computing device using the suitable beam. For example, the MMW repeater may control one or more antennas to send an MSG 4 received from the gNB to the UE computing device using the suitable beam.

Figure 8:
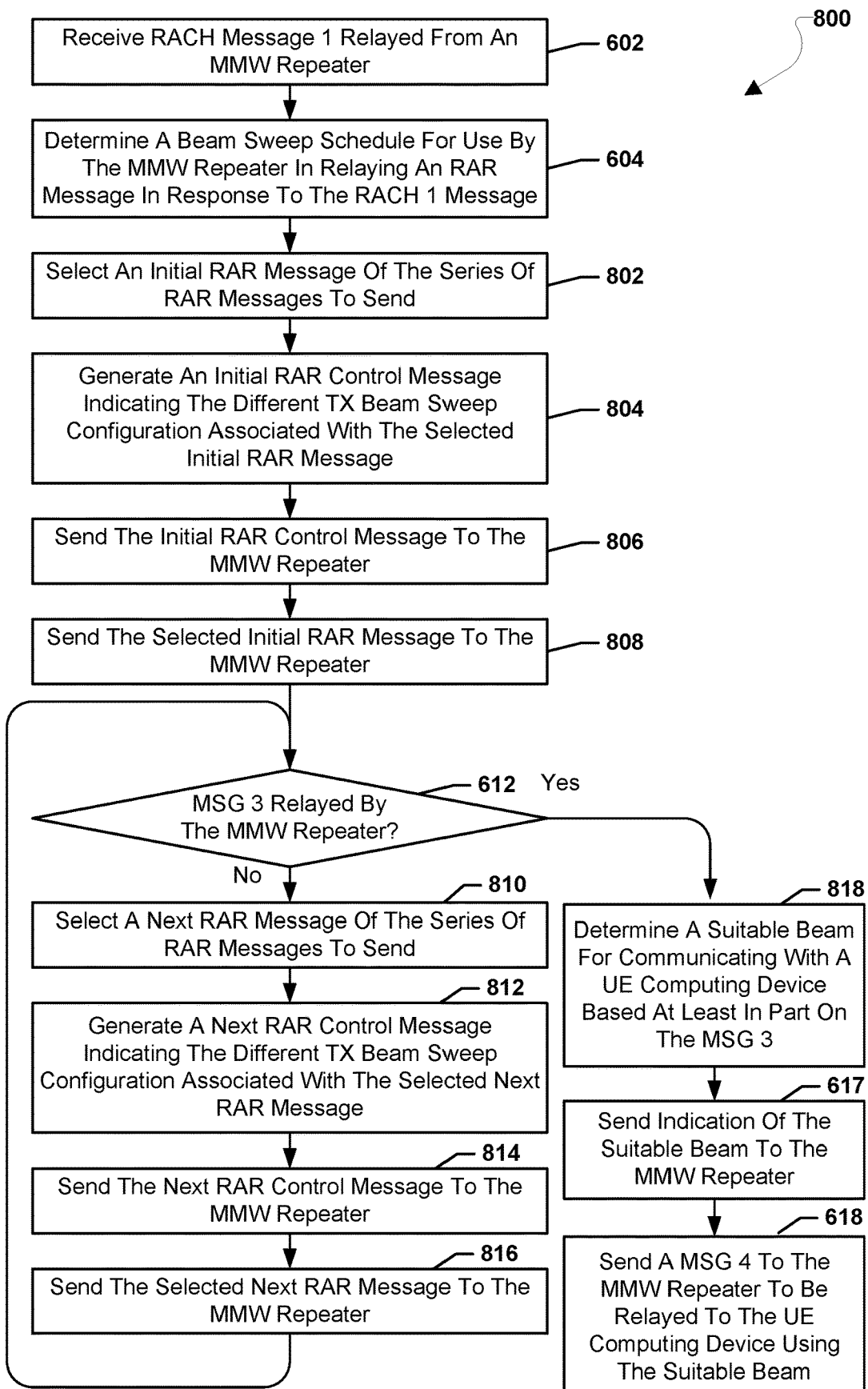
FIG. 8 is a process flow diagram illustrating a method for beam sweep configuration of an MMW repeater according to an embodiment.

FIG. 8 is a process flow diagram illustrating a method for beam sweep configuration of an MMW repeater according to an embodiment. With reference to FIGS. 1-8, the method 800 may be implemented by a processor of network device, such as a base station (e.g., the base station 110*a* (e.g., a gNB), 350), network controller 130, donor nodes, control nodes, servers, etc.

In blocks 602 and 604, the processor may perform operations of like numbered blocks of method 600 described with reference to FIG. 6 to receive a RACH message 1 and determine a beam sweep schedule.

In block 802, the processor may select an initial RAR message of the series of RAR messages to send. In some embodiments, the beam sweep schedule may indicate a relative order of RAR messages, such that the initial RAR message may be the first RAR message in the beam sweep schedule.

In block 804, the processor may generate an initial RAR control message indicating the different TX beam sweep configuration associated with the selected initial RAR message. In some embodiments, the TX beam sweep configuration for an initial RAR message may be the same beam the MMW repeater used to receive the RACH message 1 from a UE computing device (e.g., the initial TX beam may correspond to the RX beam on which the RACH message 1 was received by the MMW repeater) and/or may be the same beam the MMW repeater used to transmit an SSB that may have triggered the RACH message 1 transmission by the UE computing device (e.g., the initial TX beam may correspond to the TX beam on which the SSB was transmitted by the MMW repeater).

In block 806, the processor may send the initial RAR control message to the MMW repeater. In various embodiments, an RAR control message may be sent from the gNB to the MMW relay via a control interface, such as via in-band and/or out-of-band interfaces.

In block 808, the processor may send the selected initial RAR message to the MMW repeater.

In determination block 612, the processor may determine whether an MSG 3 is relayed by the MMW repeater as described with reference to the like numbered block of the method 600 (FIG. 6).

In response to determining that an MSG 3 has not been relayed (i.e., determination block 612="No"), the processor may select a next RAR message of the series of RAR messages to send in block 810. In some embodiments, the beam sweep schedule may indicate a relative order of RAR messages, such that the next RAR message may be the RAR message in the beam sweep schedule following a last sent or transmitted RAR message by the gNB.

In block 812, the processor may generate a next RAR control message indicating the different TX beam sweep configuration associated with the selected next RAR message. In some embodiments, the TX beam sweep configuration for the next RAR message may be a finer beam than that generated by the initial RAR control message.

In block 814, the processor may send the next RAR control message to the MMW repeater. In various embodiments, an RAR control message may be sent from the gNB to the MMW relay via a control interface, such as via in-band and/or out-of-band interfaces.

In block 816, the processor may send the selected next RAR message to the MMW repeater.

In determination block 612, the processor may determine whether an MSG 3 is relayed by the MMW repeater as described with reference to the like numbered block of the method 600 (FIG. 6). In response to determining that an MSG 3 has been relayed (i.e., determination block 612="Yes"), the processor may determine a suitable beam for communicating with a UE computing device based at least in part on the MSG 3 in block 818.

In blocks 617 and 618, the processor may perform operations of like numbered blocks of the method 600 described with reference to FIG. 6 to send an indication of the suitable beam and send an MSG 4 to the MMW repeater.

Figure 9:
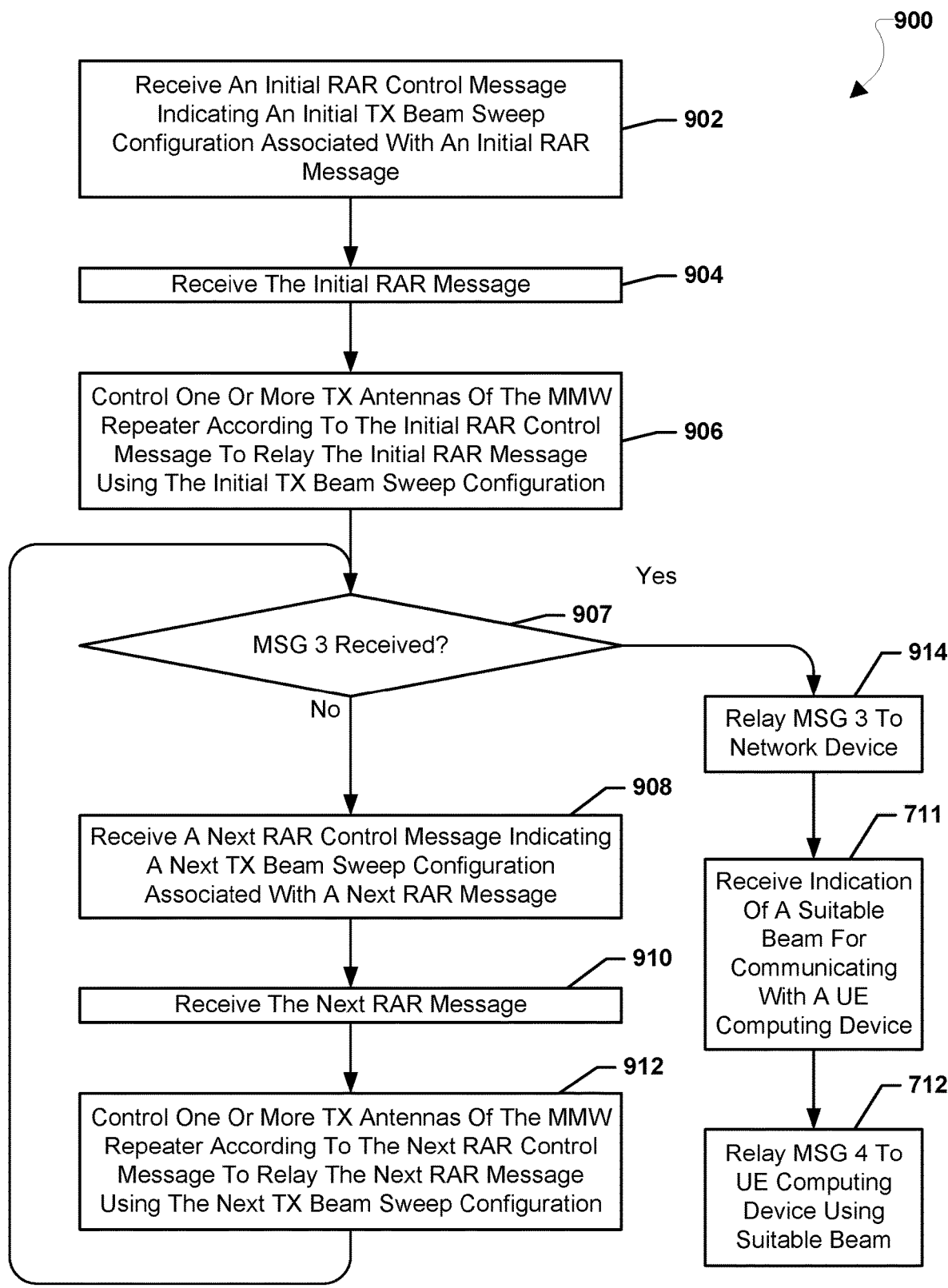
FIG. 9 is a process flow diagram illustrating a method for beam sweep configuration of an MMW repeater according to an embodiment.

FIG. 9 is a process flow diagram illustrating a method for beam sweep configuration of an MMW repeater according to an embodiment. With reference to FIGS. 1-9, the method 900 may be implemented by a processor of a relay base station (e.g., the base station 110d, the MMW repeater 400). In various embodiments, the operations of method 900 may be performed in conjunction with the operations of method 800.

In block 902, the processor may receive an initial RAR control message indicating an initial TX beam sweep configuration associated with an initial RAR message. The initial RAR control message may indicate the TX beam sweep configuration associated with a selected initial RAR message. In some embodiments, the TX beam sweep configuration for an initial RAR message may be the same beam the MMW repeater used to receive the RACH message 1 from a UE computing device (e.g., the initial TX beam may correspond to the RX beam on which the RACH message 1 was received by the MMW repeater) and/or may be the same beam the MMW repeater used to transmit an SSB that may have triggered the RACH message 1 transmission by the UE computing device (e.g., the initial TX beam may correspond to the TX beam on which the SSB was transmitted by the MMW repeater). The initial RAR message may also configure the MMW repeater's RX beam form for receiving (or listening for) MSG 3 to be the same as the TX beam form used to transmit the initial RAR message.

In block 904, the processor may receive the initial RAR message.

In block 906, the processor may control one or more TX antennas of the MMW repeater according to the initial RAR control message to relay the initial RAR control message using the initial TX beam sweep configuration.

In determination block 907, the processor may determine whether an MSG 3 is received.

In response to determining that an MSG 3 is not received (i.e., determination block 907="No"), the processor may receive a next RAR control message indicating a next TX beam sweep configuration associated with a next RAR message in block 908. In some embodiments, the TX beam sweep configuration for the next RAR message may be a finer beam than that generated by the initial RAR control message.

In block 910, the processor may receive the next RAR message.

In block 912, the processor may control one or more TX antennas of the MMW repeater according to the next RAR control message to relay the next RAR control message using the next TX beam sweep configuration.

In response to determining that an MSG 3 is received (i.e., determination block 907="Yes"), the processor may relay the MSG 3 to the network device (e.g., the gNB) in block 914.

In blocks 711 and 712, the processor may perform operations of like numbered blocks of the method 700 described with reference to FIG. 7 to receive an indication of the suitable beam and relay the MSG 4 from the network device (e.g., the gNB) to the UE computing device using the suitable beam.

Figure 10:
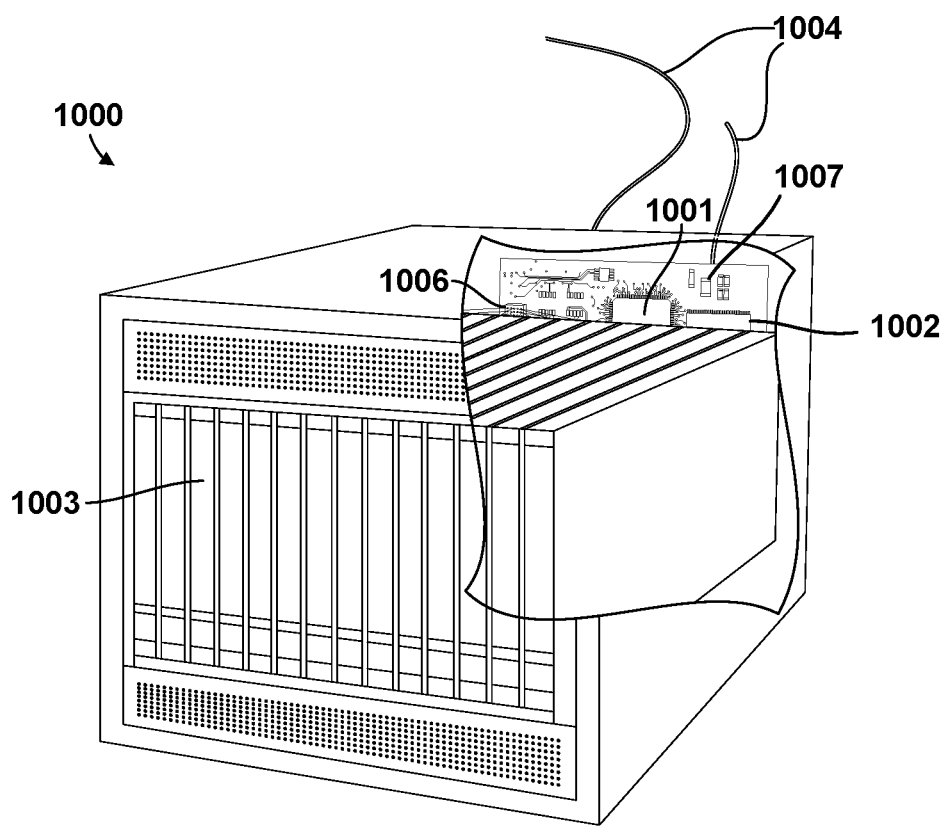
FIG. 10 is a component block diagram of a wireless router device suitable for beam sweep configuration of an MMW repeater in accordance with various embodiments.

Various embodiments may be implemented in a gNB as well as a variety of wireless network devices (e.g., base station 110a, 350), an example of which is illustrated in FIG. 10 in the form of a server device 1000 configured with processor-executable instructions to function as a gNB. Such network computing devices may include at least the components illustrated in FIG. 10. With reference to FIGS. 1-10, the network computing device 1000 may typically include a processor 1001 coupled to volatile memory 1002 and a large capacity nonvolatile memory, such as a disk drive 1003. The network computing device 1000 may also include a peripheral memory access device such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional access ports, such as USB, Firewire, Thunderbolt, and the like for coupling to peripherals, external memory, or other devices.

Figure 11:
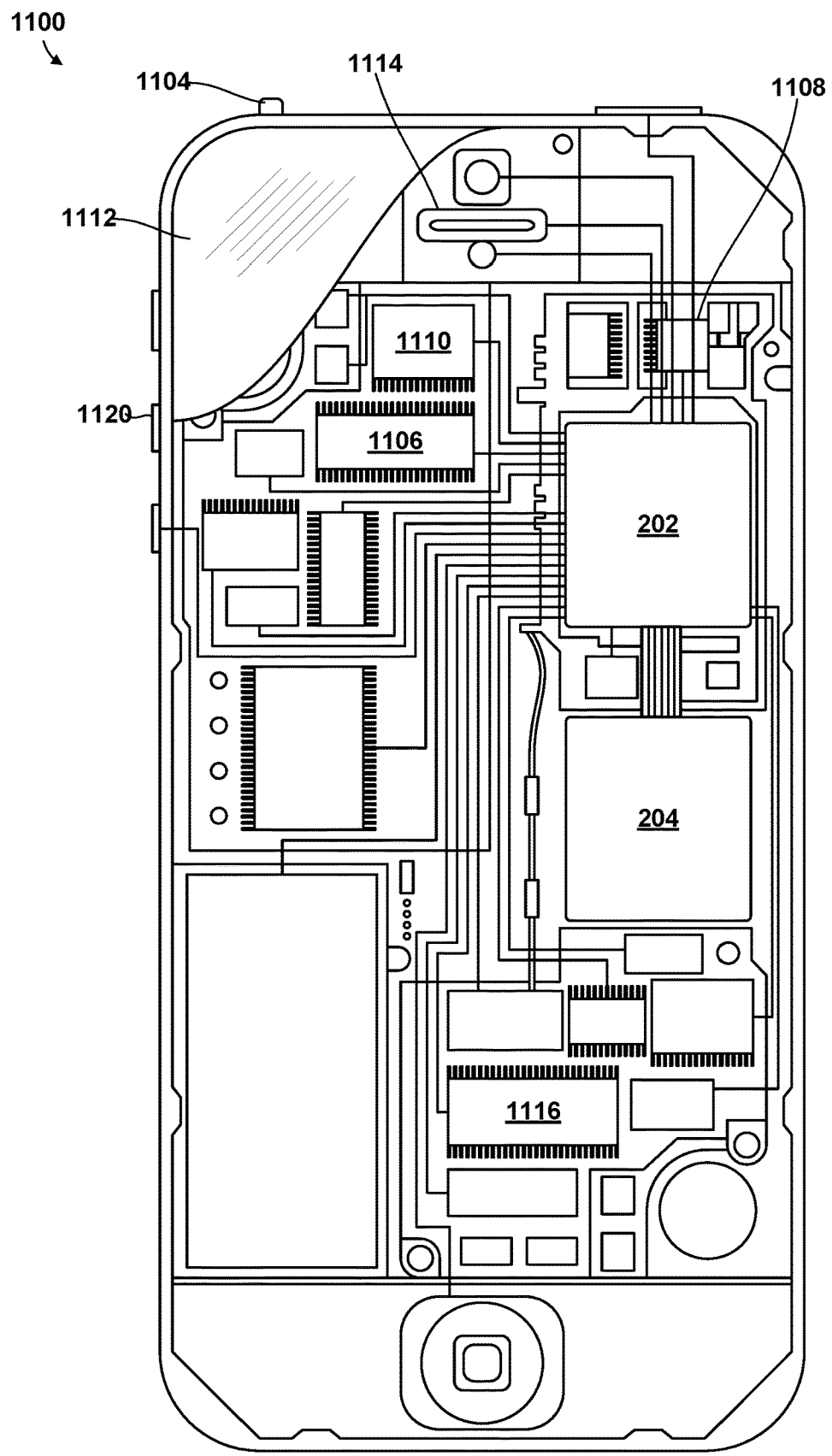
FIG. 11 is a component block diagram of a wireless communication device suitable for beam sweep configuration of an MMW repeater in accordance with various embodiments.

Various embodiments may be implemented on a variety of computing devices (e.g., the computing device 120a-120e, 200, 320), an example of which is illustrated in FIG. 11 in the form of a smartphone 1100. With reference to FIGS. 1-11, the smartphone 1100 may include a first SOC 202 (e.g., a SOC-CPU) coupled to a second SOC 204 (e.g., a 5G capable SOC). The first and second SOCs 202, 204 may be coupled to internal memory 1106, 1116, a display 1112, and to a speaker 1114. Additionally, the smartphone 1100 may include an antenna 1104 for sending and receiving electromagnetic radiation that may be connected to a wireless data link and/or cellular telephone transceiver 1108 coupled to one or more processors in the first and/or second SOCs 202, 204. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1108 and CODEC 1110 may include a digital signal processor (DSP) circuit (not shown separately).

The processors of the wireless network computing device 1000 and the smart phone 1100 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for beam sweep configuration of a millimeter wave (MMW) repeater during random access channel (RACH) procedures, comprising:
   receiving, by a processor of a network device, a RACH 1 message relayed by an MMW repeater;
   determining, by the processor of the network device, a beam sweep schedule for use by the MMW repeater in relaying a random access response (RAR) message in response to the RACH 1 message, wherein the beam sweep schedule indicates a series of RAR messages to be sent successively and a different transmit (TX) beam sweep configuration to be used by the MMW repeater for each of the series of RAR messages;
   generating, by the processor of the network device, an RAR control message indicating the beam sweep schedule;
   sending, by the processor of the network device, the RAR control message to the MMW repeater; and
   sending, by the processor of the network device, the series of RAR messages to the MMW repeater.

2. The method of claim 1, wherein the network device is a Next Generation NodeB (gNB).

3. The method of claim 2, further comprising:
   receiving, by the processor of the gNB, a message 3 relayed by the MMW repeater, wherein the message 3 is generated by a computing device in response to at least one of the series of RAR messages;
   determining, by the processor of the gNB, a suitable beam for communicating with the computing device based at least in part on the message 3; and
   sending, by the processor of the gNB, a cancelation message to the MMW repeater in response to determining that the suitable beam for communicating with the computing device, wherein the cancelation message is configured to cause the MMW repeater to cancel any remaining RAR messages in the beam sweep schedule.

4. The method of claim 3, wherein the message 3 is relayed by the MMW repeater according to one or more conditions indicated in the RAR control message.

5. The method of claim 3, further comprising:
   determining, by the processor of the gNB, a suitable beam for communicating with the computing device based at least in part on the message 3; and
   sending, by the processor of the gNB, an indication of the suitable beam to the MMW repeater.

6. The method of claim 2, wherein the different TX beam sweep configuration associated with a first of the series of RAR messages to be sent according to the beam sweep schedule generates a same beam as used by the MMW repeater to receive the RACH 1 message or forward a synchronization signal block (SSB).

7. The method of claim 2, wherein the different TX beam sweep configurations indicated in the beam sweep schedule are determined based at least in part on an attribute of the RACH 1 message.

8. The method of claim 7, wherein the attribute of the RACH 1 message is a received power of the RACH 1 message or a received timing of the RACH 1 message.

9. The method of claim 8, wherein the attribute of the RACH 1 message is determined by the gNB.

10. The method of claim 8, wherein the attribute of the RACH 1 message is indicated to the gNB by the MMW repeater.

11. A method for beam sweep configuration of a millimeter wave (MMW) repeater during random access channel (RACH) procedures, comprising:
    receiving, by a processor of a network device, a RACH 1 message relayed by an MMW repeater;
    determining, by the processor of the network device, a beam sweep schedule for use by the MMW repeater in relaying a random access response (RAR) message in response to the RACH 1 message, wherein the beam sweep schedule indicates a series of RAR messages to be sent successively and a different transmit (TX) beam sweep configuration to be used by the MMW repeater for each of the series of RAR messages;
    selecting, by the processor of the network device, an initial RAR message of the series of RAR messages to send;
    generating, by the processor of the network device, an initial RAR control message indicating the different TX beam sweep configuration associated with the selected initial RAR message;
    sending, by the processor of the network device, the initial RAR control message to the MMW repeater; and
    sending, by the processor of the network device, the selected initial RAR message to the MMW repeater.

12. The method of claim 11, wherein the network device is a Next Generation NodeB (gNB).

13. The method of claim 12, further comprising:
    determining, by the processor of the gNB, whether a message 3 relayed by the MMW repeater in response to the initial RAR control message is successfully received; and
    determining, by the processor of the gNB, a suitable beam for communicating with a computing device based at least in part on the message 3 in response to determining that the message 3 relayed by the MMW repeater in response to the initial RAR control message was successfully received.

14. The method of claim 13, further comprising:
    sending, by the processor of the gNB, an indication of the suitable beam to the MMW repeater; and
    sending, by the processor of the gNB, a message 4 to be relayed by the repeater to the computing device using the suitable beam.

15. The method of claim 12, further comprising, in response to determining that a message 3 relayed by the MMW repeater in response to the initial RAR control message was not successfully received:
  selecting, by the processor of the gNB, a next RAR message of the series of RAR messages to send;
  generating, by the processor of the gNB, a next RAR control message indicating the different TX beam sweep configuration associated with the selected next RAR message;
  sending, by the processor of the gNB, the next RAR control message to the MMW repeater; and
  sending, by the processor of the gNB, the selected next RAR message to the MMW repeater.

16. The method of claim 15, wherein the different TX beam sweep configuration associated with the selected next RAR message generates a narrower beam than a beam generated by the different TX beam sweep configuration associated with the selected initial RAR message.

17. The method of claim 11, wherein the different TX beam sweep configuration associated with a first of the series of RAR messages to be sent according to the beam sweep schedule generates a same beam as used by the MMW repeater to receive the RACH 1 message or forward an SSB.

18. The method of claim 12, wherein the different TX beam sweep configurations indicated in the beam sweep schedule are determined based at least in part on an attribute of the RACH 1 message.

19. The method of claim 18, wherein the attribute of the RACH 1 message is a received power of the RACH 1 message or a received timing of the RACH 1 message.

20. The method of claim 18, wherein the attribute of the RACH 1 message is determined by the gNB.

21. The method of claim 18, wherein the attribute of the RACH 1 message is indicated to the gNB by the MMW repeater.

22. A method for beam sweep configuration of a millimeter wave (MMW) repeater during random access channel (RACH) procedures, comprising:
  receiving, by a processor of an MMW repeater, a random access response (RAR) control message from a network device indicating a beam sweep schedule, wherein the beam sweep schedule indicates a series of RAR messages to be sent successively and a different transmit (TX) beam sweep configuration to be used by the MMW repeater for each of the series of RAR messages;
  receiving, by the processor of the MMW repeater, the series of RAR messages from the network device; and
  controlling, by the processor of the MMW repeater, one or more TX antennas of the MMW repeater according to the RAR control message to successively relay each of the series of RAR messages using that RAR message's respective different TX beam sweep configuration.

23. The method of claim 22, further comprising:
  receiving, by the processor of the MMW repeater, a cancelation message from the network device; and
  canceling, by the processor of the MMW repeater, the relay of any remaining RAR messages in the beam sweep schedule in response to receiving the cancelation message.

24. The method of claim 22, wherein the different TX beam sweep configuration associated with a first of the series of RAR messages relayed according to the beam sweep schedule generates a same beam as used by the MMW repeater to receive a RACH 1 message or forward an SSB.

25. The method of claim 22, further comprising:
  receiving, by the processor of the MMW repeater, an indication of a suitable beam for communicating with a computing device; and
  relaying, by the processor of the MMW repeater, a message 4 from the network device to the computing device using the suitable beam.

26. The method of claim 22, wherein the network device is a Next Generation NodeB (gNB).

27. A method for beam sweep configuration of a millimeter wave (MMW) repeater during random access channel (RACH) procedures, comprising:
  receiving, by a processor of an MMW repeater, an initial random access response (RAR) control message indicating an initial TX beam sweep configuration associated with an initial RAR message;
  receiving, by the processor of the MMW repeater, the initial RAR message;
  controlling, by the processor of the MMW repeater, one or more TX antennas of the MMW repeater according to the initial RAR control message to relay the initial RAR message using the initial TX beam sweep configuration;
  receiving, by the processor of the MMW repeater, a next RAR control message indicating a next TX beam sweep configuration associated with a next RAR message;
  receiving, by the processor of the MMW repeater, the next RAR message; and
  controlling, by the processor of the MMW repeater, one or more TX antennas of the MMW repeater according to the next RAR control message to relay the next RAR message using the next TX beam sweep configuration.

28. The method of claim 27, wherein the next TX beam sweep configuration generates a narrower beam than a beam generated by the initial TX beam sweep configuration.

29. The method of claim 27, wherein the beam generated by the initial TX beam sweep configuration is a same beam as used by the MMW repeater to receive a RACH 1 message or forward an SSB.

30. The method of claim 27, further comprising:
  receiving, by the processor of the MMW repeater, an indication of a suitable beam for communicating with a computing device; and
  relaying, by the processor of the MMW repeater, a message 4 from a Next Generation NodeB (gNB) to the computing device using the suitable beam.

* * * * *